Aug. 30, 1949.  H. B. JAYNES  2,480,370
AUTOMOBILE LIGHTING CIRCUIT
Filed Aug. 26, 1947  2 Sheets-Sheet 1

INVENTOR.
HAL B. JAYNES
BY
ATTORNEY

*INVENTOR.*
HAL B. JAYNES

ATTORNEY

Patented Aug. 30, 1949

2,480,370

UNITED STATES PATENT OFFICE 2,480,370

AUTOMOBILE LIGHTING CIRCUIT

Hal B. Jaynes, Lenoir, N. C.

Application August 26, 1947, Serial No. 770,696

4 Claims. (Cl. 171—97)

This invention relates to a lighting circuit for an automotive vehicle and more especially to an automatically controlled circuit which will automatically turn on the bright forward lights of the automotive vehicle as it moves forwardly and which will automatically extinguish the bright forward lights of the automotive vehicle and will automatically illuminate a backing light when the automobile is being driven in a reverse direction.

It is an object of this invention to provide means controlled by a rotary part of the automobile such as the drive shaft extending from the transmission housing to the differential housing which will automatically illuminate the front head lights when the automobile is moving forwardly and which will automatically extinguish the bright forward lights and illuminate a backing light on the rear of the automotive vehicle when the automobile is backed up or driven in a reverse direction, as well as automatically illuminating green lights and a tail light when the automobile is proceeding in a forward direction.

Some of the objects of the invention having been stated, other objects will appear as the description proceeds when taken in connection with the accompanying drawings, in which Figure 1 is a schematic wiring diagram of the lighting system for the automotive vehicle;

Figure 1:
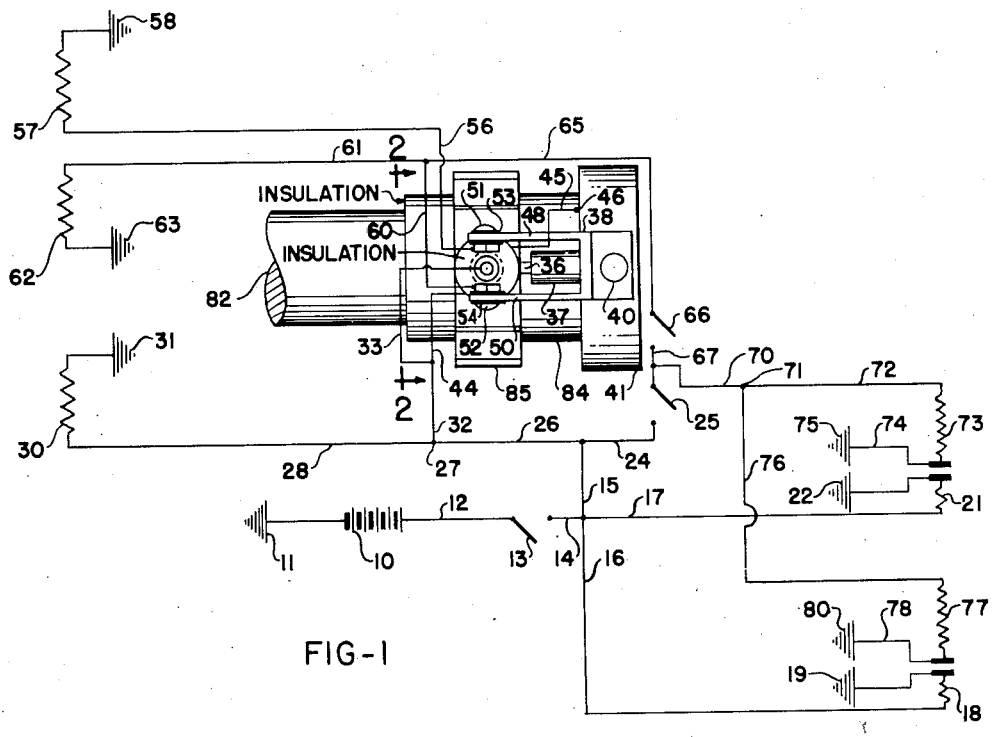
Figure 4:
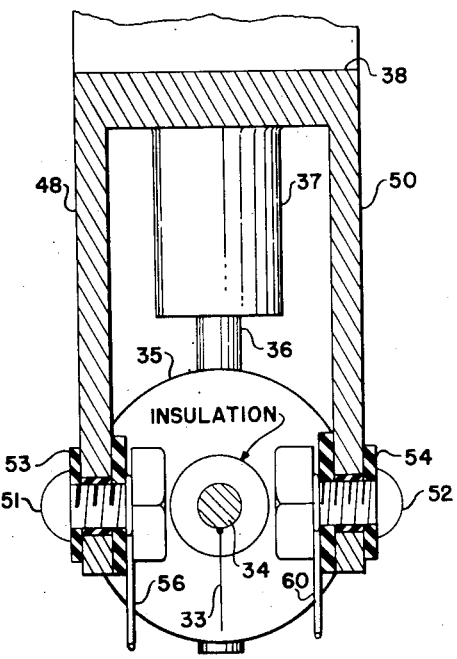
Figure 4 is a sectional plan view taken along the line 4—4 in Figure 2.
Figure 3:
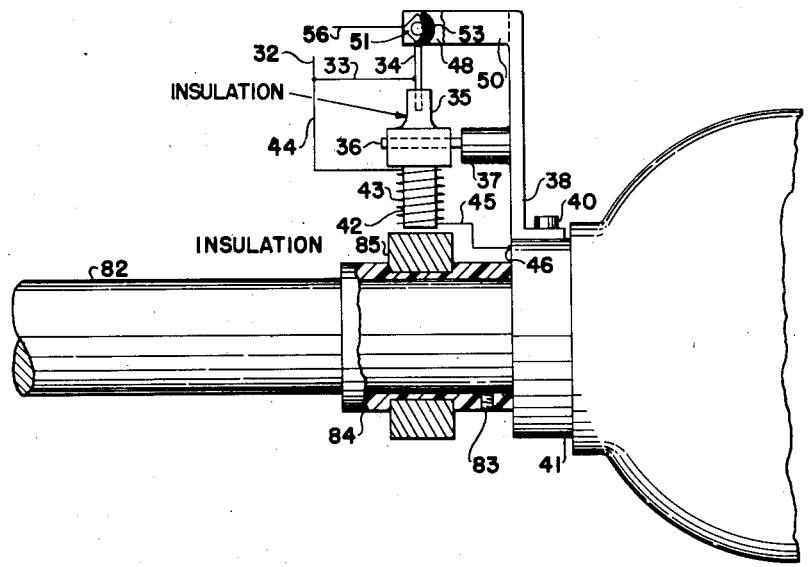
Figure 3 is an elevation looking from the lower central portion of Figure 1 and showing portions thereof broken away.
Figure 2:
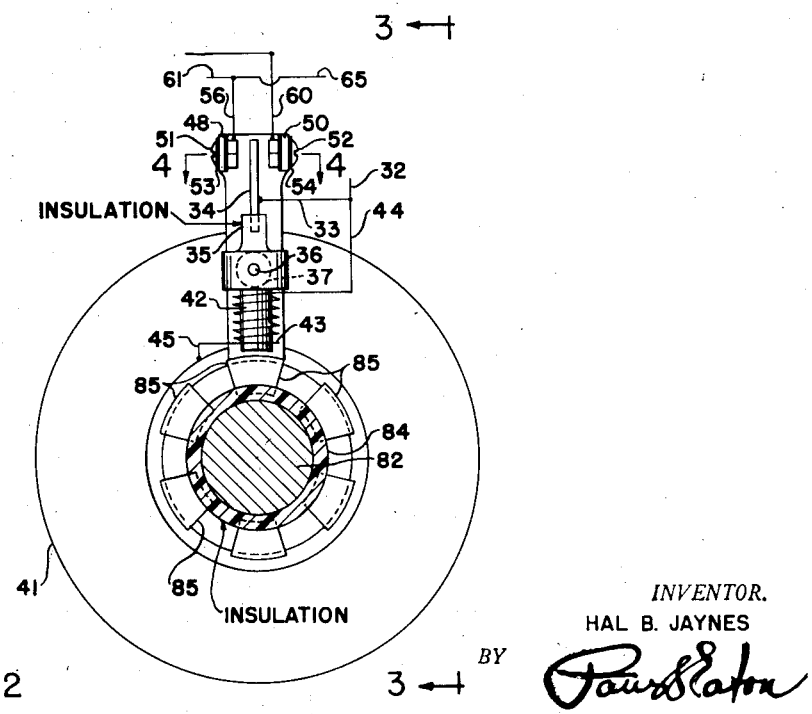
Figure 2 is a vertical sectional view taken along the line 2—2 in Figure 1.

Referring more specifically to the drawings, the numeral 10 indicates a suitable source of electrical current such as a battery which is grounded as at 11 which is usually to the framework of the automotive vehicle. Leading from the other side of battery 10 is a wire 12 which leads to a main light switch 13. Leading from the main light switch 13 is a wire 14 which is connected to wires 15, 16 and 17. Wire 16 leads to a dimmer filament 18 which filament is grounded as at 19. Wire 17 leads to the other dimmer filament 21 which is grounded as at 22. Wire 15 is connected to a wire 24 which leads to one side of a switch 25. Also connected to wire 15 is a wire 26 which branches at 27, and a wire 28 leads to a tail light filament 30 which is grounded as at 31.

Connected to junction point 27 is a wire 32 which has a branch 33 leading to a metallic contact member 34 mounted in an insulation block 35 pivoted on a pin 36 extending from a projection 37 on an uprising bracket 38 secured as at 40 to the transmission housing 41 of the automotive vehicle.

Mounted in the lower end of insulation member 35 as by molding the same therearound is a soft iron core 42 which is surrounder by a coil 43, ranch wire 44 leads from wire 32 to one end of coil 43 and from the other end of coil 43 a wire 45 is grounded as at 46 to the transmission housing 41.

The bracket 38 extends upwardly and branches into two portions 48 and 50 in the free ends of which are mounted contact members 51 and 52 which are insulated from the arms 48 and 50 by insulating members 53 and 54. The contact member 34 has swinging movement between the proximate surfaces of the contact members 51 and 52. Contact member 51 has connected thereto a wire 56 which connects to one side of a backing light filament 57 whose other side is grounded as at 58.

Contact 52 has leading therefrom a wire 60 which is connected to a wire 61 which in turn is connected to a filament 62 of a green light grounded as at 63. The wire 60 also has connected thereto a wire 65 which extends forwardly and is connected to a switch 66. A wire 67 leads from the other side of switch 66 and is connected to switch 25.

Intermediate the switches 66 and 25 there is connected to wire 67 a wire 70 which has a junction point 71 to which is connected a wire 72 which leads to one side of bright forward filament 73 and which has a wire 74 leading from the other side thereof and grounded as at 75. Junction point 71 has connected thereto a wire 76 which leads to one side of another bright filament 77 which has a wire 78 connected to the other side thereof which is grounded as at 80.

Extending from the transmission housing 41 is a drive shaft 82 which has fixedly secured thereon, by any suitable means such as a set screw 83, a sleeve 84. In the sleeve 84 and projecting therefrom and spaced apart from each other are soft iron members 85 which are adapted to rotate as the drive shaft 82 rotates.

Method of operation

Let us assume that switches 13 and 66 are normally in closed position. Thus when the automotive vehicle starts forwardly, the soft iron members 85 will attract the solenoid core 45 and move the contact member 34 over against contact 52. This will cause current to flow through wires 70 and 76 to the bright filaments 73 and 77. It will also cause current to flow through wires 28 and 61 to the green light filament 62 and the filament of the tail light 30. Now, when the automobile is stopped and it is desired to back the automobile, then drive shaft 82 will move in the opposite direction and contact arm 34 will be moved over against contact 51 which will cause current to flow through wire 56 to the backing light filament 57. The grelen light filament 62 will not be illuminated because the contact 52 will not be in engagement with contact member 34. However, the tail light filament 30 will continue to be illuminated.

Now in the event that the automotive vehicle is motionless and it is desired to illuminate the bright filaments 73 and 77, then switch 25 can be manually closed which will allow the current to flow through wire 24, switch 25, wire 70, and wire 72 to bright filament 73 and also through wire 76 to bright filament 77.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In an automotive vehicle having a drive shaft, a transmission housing, and a source of electrical energy, said vehicle also having a pair of electrical circuits, means controlled by the direction of rotation of the shaft for alternately introducing current from the source to each of the circuits comprising an insulation ring secured to the drive shaft and having a plurality of spaced soft iron members projecting outwardly from the same, a magnetic coil pivotally suspended above the soft iron member, a metallic contact member insulated from the magnetic coil and extending upwardly from the same, means connecting the source of electrical energy to the magnetic coil and the metallic contact member, a pair of spaced electrical contacts between which the upper end of the metallic contact member projects, a pair of electrical circuits, a conductor between one of the electrical circuits and one of the electrical contacts and a conductor between the other of the electrical circuits and the other of the contacts whereby when the drive shaft is motionless the metallic contact member does not contact either of the spaced contacts and whereby upon rotation of the drive shaft in one direction, the metallic contact member engages one of the spaced electrical contacts to close one of the circuits and whereupon on a reverse motion of the drive shaft, the upwardly projecting metallic contact member engages the other of the spaced electrical contacts to thus open the first-named circuit and to close the other of the circuits.

2. In an automotive vehicle having a first electrical circuit and a second electrical circuit and a third electrical circuit and a fourth electrical circuit and a fifth electrical circuit, said vehicle also having a drive shaft and a transmission housing with means for rotating the drive shaft in either direction and a source of electrical energy, an uprising bracket secured to the transmission housing and having a pair of spaced contacts secured thereto and being insulated from the bracket, an insulation block disposed below the spaced contacts and being pivotally secured to the uprising bracket, a metallic contact member projecting upwardly from the insulation member between the first-named contacts and adapted to engage either one of the contacts one at a time, a magnetic coil depending from the insulation block, means connecting the source of electrical energy to the magnetic coil and the metallic contact member, a conductor between the first and fourth circuits and one of the spaced contacts, a conductor between the second, third and fifth circuits and the other of the spaced contacts, a plurality of radially disposed metallic segments secured on but insulated from the drive shaft and disposed immediately below the magnetic coil in slightly spaced relation thereto as they revolve past the magnetic coil, whereby upon forward motion of the vehicle rotation is imparted to the drive shaft in one direction and the lower end of the magnetic coil being magnetically attracted to the metallic segments will move in one direction by rotation of the drive shaft to thus cause the metallic contact member to be moved in one direction to engage one of the contacts for automatically closing the first and fourth circuits and whereby upon reverse movement of the vehicle, the metallic contact member moves out of engagement with the first contact and into engagement with the other of the contacts and thus opens the first and fourth circuits and closes the second, third and fifth circuits.

3. Apparatus responsive to the direction of rotation of a shaft comprising a plurality of radially disposed equally spaced contact elements secured to said shaft, a pair of spaced contacts disposed on the same horizontal plane immediately above the contact elements, an insulation member pivotally suspended between the horizontal planes of the spaced contact members and the shaft, an electro-magnet extending downwardly from the insulation member, the lower end of which is disposed in slightly spaced relation to the contact elements when the shaft is rotated, a metallic contact pin extending upwardly from the upper end of the insulation block and between the spaced contacts but in spaced relation thereto, a source of electrical energy and means for connecting the same to said electro-magnet and to said pin, a first and a second circuit, means for electrically connecting the first and second circuits one to each of the spaced contacts, whereby upon rotation of the shaft in one direction, the electro-magnet will be drawn at its lower end towards the direction of rotation of the shaft to thus move the upper end of the metallic pin into engagement with one of the contact members to close the first circuit and whereby upon reverse rotation of the shaft the upper end of the metallic contact pin moves out of engagement with the first contact and into engagement with the second contact to thereby open the first circuit and to close the second circuit.

4. In an automotive vehicle having first, second, third, fourth and fifth electrical circuits, and also having a drive shaft and a transmission housing, an electro-magnet disposed above the drive shaft, a contact pin extending from the upper end of the electro-magnet, first and second electrical contacts disposed on opposite sides of the metallic pin and in spaced relation thereto, a source of electrical energy and means for connecting the same to the electro-magnet and said pin, means for electrically connecting the first and second circuits to the first electrical contact and means for electrically connecting the third, fourth and fifth circuits to the second electrical contact, means whereby upon rotation of the shaft the lower end of the electro-magnet is drawn toward the direction of rotation of the shaft and thereby moves the contact pin into engagement with the first contact to thus close the first and second circuits and whereby upon reverse rotation of the shaft, the lower end of the electro-magnet will be caused to move in the opposite direction toward the direction of rotation of the shaft to cause the contact pin to move out of engagement with the first contact and into engagement with the second contact to open the first and second circuits and to close the third, fourth and fifth circuits.

HAL B. JAYNES.

REFERENCES CITED

The following references are of record in the file of this patent:

UNITED STATES PATENTS

| Number | Name | Date |
|---|---|---|
| 1,105,035 | McMurtry | July 28, 1914 |
| 1,222,720 | Bijur | Apr. 17, 1917 |
| 2,096,069 | Seiden | Oct. 19, 1937 |
| 2,109,408 | Adam | Feb. 22, 1938 |
| 2,190,682 | Satterlee | Feb. 20, 1940 |
| 2,422,973 | Martin | June 24, 1947 |